United States Patent [19]

Britt

[11] Patent Number: 5,022,423
[45] Date of Patent: Jun. 11, 1991

[54] SAFETY VALVE

[76] Inventor: Franklin J. Britt, 3744 Hartland Rd., Gasport, N.Y. 14067

[21] Appl. No.: 508,282

[22] Filed: Apr. 11, 1990

[51] Int. Cl.5 .................. F16K 17/40; F16K 24/04; F17C 13/12
[52] U.S. Cl. .................. 137/68.1; 137/329.3; 137/614.2; 137/901; 222/3; 222/397; 222/501; 222/545
[58] Field of Search .......... 137/68.1, 70–71, 137/329.1, 329.2, 329.3, 467, 498, 533.11, 901; 220/203; 222/3, 396, 397, 501, 545

[56] References Cited

U.S. PATENT DOCUMENTS

| | | | |
|---|---|---|---|
| 2,301,724 | 11/1942 | Vischer, Jr. | 220/203 |
| 2,429,149 | 10/1947 | Wittenberg | 220/203 |
| 2,769,457 | 11/1956 | Wittenberg | 220/203 |
| 2,945,503 | 7/1960 | Atkinson | 137/68.1 |
| 3,618,626 | 11/1971 | Russo | 137/68.1 |
| 3,645,286 | 2/1972 | Follett | 137/68.1 |
| 4,077,422 | 3/1978 | Brinkley et al. | 137/68.1 |
| 4,562,852 | 1/1986 | Britt | 137/68.1 |
| 4,606,367 | 8/1986 | Britt | 137/68.1 |
| 4,766,923 | 8/1988 | Roper | 137/62 |

Primary Examiner—George L. Walton

[57] ABSTRACT

A safety and service valve for a high pressure tank having a sealing portion within the tank, an external portion externally of the tank, a flow passage between inlet and outlet ports, and a chamber having an inlet end and an outlet end, the outlet end having a valve seat. A valve element is loosely received by the chamber and adapted to engage the valve seat to thereby close the flow passage when the fluid pressure at the chamber inlet end is higher than the fluid pressure at the chamber outlet end. A stop member prevents the valve element from engaging the valve seat until the external portion of the body is severed from the sealing portion.

In one aspect, the valve includes a bleed passage in the sealing portion of the valve for placing the tank in fluid communication with the flow passage and allowing release of pressure in the tank in a safe manner if the external portion of the body is severed from the sealing portion. In another aspect, the valve element is a ball of deformable material wherein the diameter of the ball and the diameter of the passage are selected such that if the external portion of the valve body is severed from the sealing portion, the valve element is forced out through the passage allowing release of pressure in the tank if the pressure exceeds a predetermined magnitude.

9 Claims, 3 Drawing Sheets

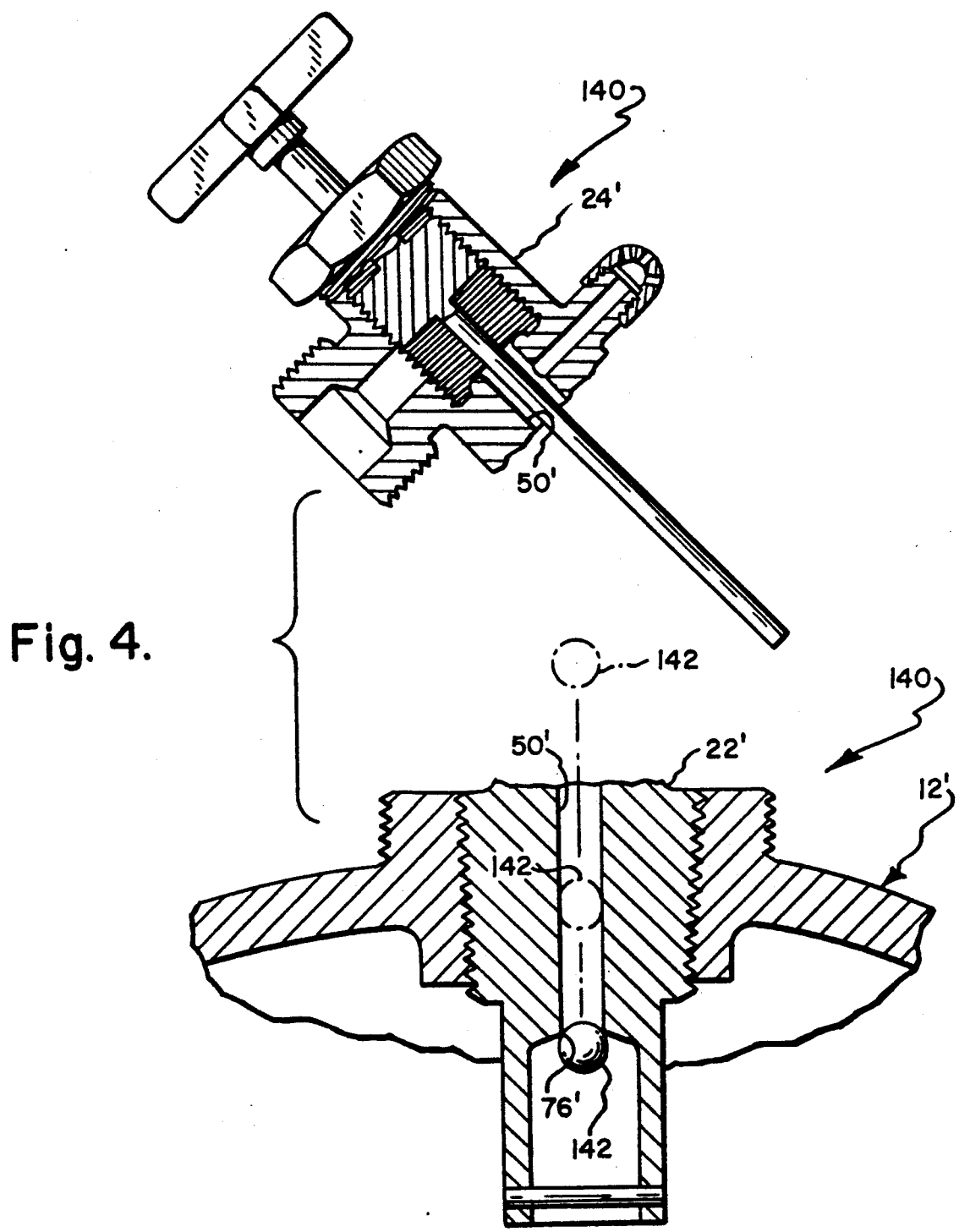

SAFETY VALVE

This invention relates to the valve art, and more particularly to a new and improved combination safety and service valve for high pressure tanks.

The combination safety and service valve to which this invention relates is used with high pressure tanks or containers for storing gas used, for example, in welding, heating and breathing apparatus. Such valves commonly include a body having a sealing portion which is adapted to close an opening in the tank and having another portion which, when the sealing portion closes the tank opening, is positioned externally of the tank. The valve body also has a flow passage through which the tank is emptied or filled.

Combination safety and service valves of the aforesaid type have been provided with safety means for preventing the sudden escape of contents of the high pressure tank in the event the external portion of the valve is broken off. Such sudden escape of gas can propel the tank with great force causing injury and damage. For example, in the valve of U.S. Pat. No. 4,562,852 a movable valve element is forced into sealing engagement with the flow passage to prevent escape of gas from the tank in the event the external portion of the valve is severed from the sealing portion.

In valve arrangements including such safety means, it may be desirable to provide for controlled release of gas from the tank upon sealing operation of the valve element in response to separation of the external valve portion. For example, if the tank contains gas harmless to persons and the environment, slow release of the gas from the tank in a safe manner removes the potential danger otherwise associated with leaving such gas in the tank with damaged valve. On the other hand, if the tank contains gas which is harmful, it nevertheless may be prudent to remove the gas as soon as safely possible in some situations, such as exposure of the tank to extreme heat causing pressure build-up in the tank. Removing the gas immediately from the tank in this situation will avoid the greater danger of explosion and consequent injury and damage.

It would, therefore, be highly desirable to provide a combination safety and service valve for tanks containing high pressure gas wherein controlled, safe release of the gas is provided in response to severing of a portion of the valve from the tank.

SUMMARY OF THE INVENTION

It is, therefore, a primary object of the present invention to provide a new and improved combination safety and service valve for high pressure gas tanks.

It is a further object of this invention to provide such a valve which allows controlled release of gas in a safe manner when a portion of the valve is severed from the combination.

It is a further object of this invention to provide such a valve which is simple in structure and economical to manufacture.

It is a further object of this invention to provide such a valve which is dependable and reliable in operation.

The present invention provides a combination safety and service valve for a high pressure tank wherein the valve comprises a body having a sealing portion positioned within the tank and an external portion positioned externally of the tank, the sealing portion including an inlet port and an outlet port, the body having a flow passage extending between the inlet and outlet ports so that a portion of the flow passage is provided by the sealing portion and another portion of the flow passage is provided by the external portion of the body, the portion of the flow passage provided by the sealing portion including a chamber, the chamber having an inlet end and an outlet end, and the outlet end having a valve seat positioned within the tank opening between an inlet and an outlet of the tank opening. The valve further comprises a valve element loosely received by the chamber and adapted to engage the valve seat to thereby close the flow passage, the valve element being of such size that when the fluid pressure at the chamber inlet end is higher than the fluid pressure at the chamber outlet end, the valve element is biased into sealing engagement with the valve seat of the chamber and substantially all of the valve element is disposed within the tank opening between the inlet and the outlet of the tank opening. An actuatable valve member is connected to the external portion of the body for opening and closing the flow passage, and stop means associated with the valve member prevents the valve element from engaging the valve seat in all open positions of the valve member until the external portion of the body is severed from the sealing portion.

In one aspect thereof, the valve of the present invention includes bleed passage means in the sealing portion of the body for placing the tank in fluid communication with the flow passage between the valve seat and the valve member, the bleed passage means allowing release of pressure in the tank in a safe manner if the external portion of the body is severed from the sealing portion. In another aspect thereof, the valve element is of deformable material and is in the form of a spherical ball wherein the diameter of the ball and the diameter of the passage are selected such that if the external portion of the valve body is severed from the sealing portion, the valve element is forced out through the passage allowing release of pressure in the tank if the pressure exceeds a predetermined magnitude.

BRIEF DESCRIPTION OF THE DRAWING FIGURES

FIG. 4 is a view similar to FIG. 3 illustrating operation of a valve according to another embodiment of the present invention.

DETAILED DESCRIPTION OF THE ILLUSTRATED EMBODIMENTS

Figure 1:
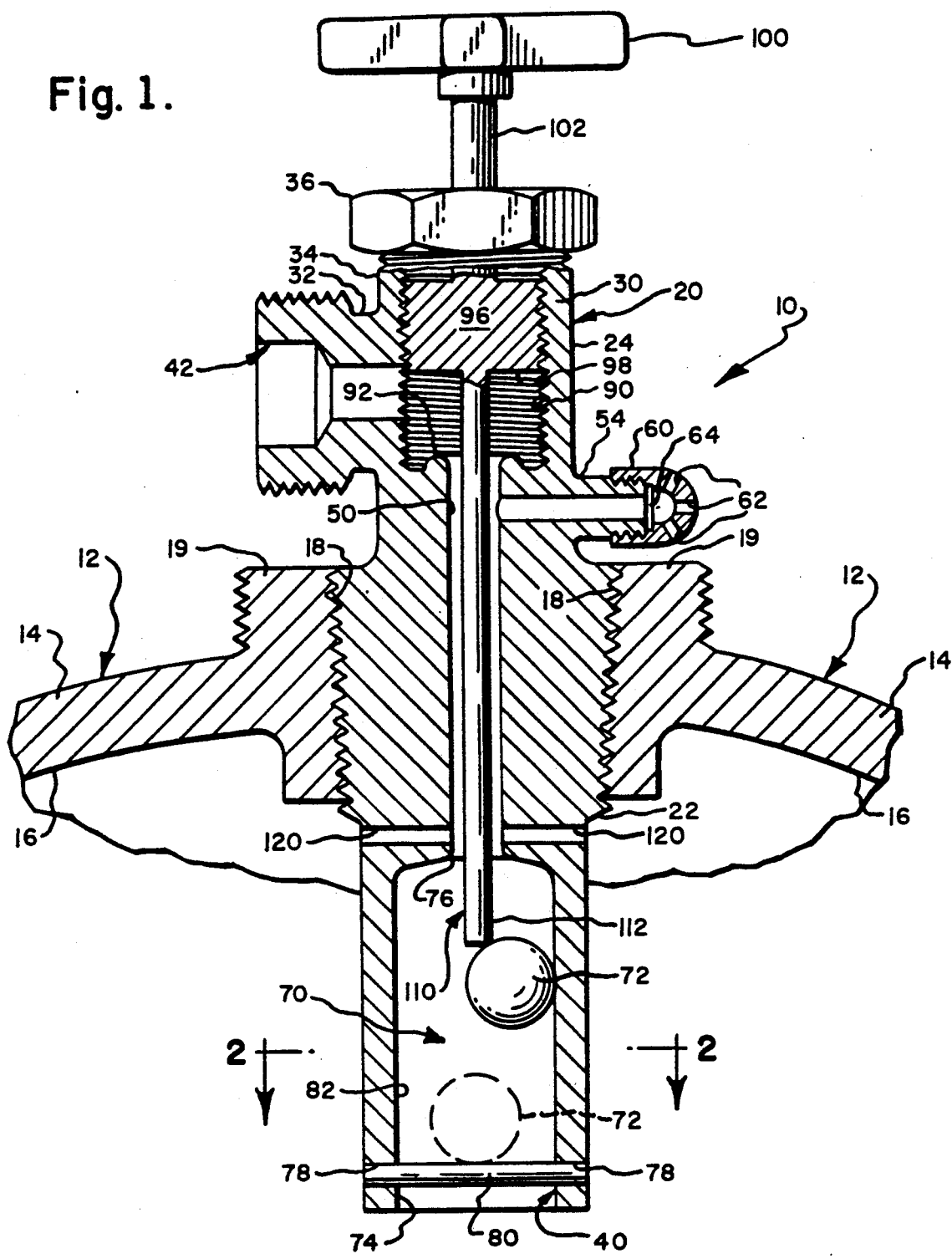
FIG. 1 is a fragmentary longitudinal sectional view of a safety and service valve in accordance with the present invention shown operatively connected to a high pressure tank.

Referring now to the drawings, there is shown in FIG. 1 a combination safety and service valve in accordance with the present invention and generally designated 10. The valve 10 is particularly adapted for utilization with a tank 12 of the type used to store fluids, for example gas at high pressure used for welding, heating and breathing and liquids at various pressures for a variety of uses. The high-pressure tank 12 includes an outer hollow metal shell 14 having an interior wall 16 which surrounds the tank interior. Access to the tank interior is provided by a single, internally-threaded opening 18 in the tank shell 14. The wheel 14 also includes an externally-threaded extension 19 which is adapted to accept a removable protective cap (not shown) for protecting the valve 10 during transportation of the tank 12.

The safety and service valve 10 includes a body generally designated 20 and constructed of suitable material, such as brass, which is capable of withstanding high pressures within the tank 12. The body 20 has a sealing portion 22 which is externally threaded so as to be operatively, i.e. threadably, received by the threaded opening 18 of the tank shell 14 and an external portion 24 which, as shown in FIG. 1, is positioned externally of the tank 12 when the sealing portion 22 is received by the tank opening 18. It will be understood that when the sealing portion 22 is operatively received by the opening 18, the opening is closed and sealed.

As shown in FIG. 1, the sealing portion 22 is generally elongated in shape and relatively cylindrical from one end, or its upper end as shown, to its other or lower end. The external portion 24 has a major section 30 which is generally cylindrical and elongated in shape and which has a longitudinal axis which is aligned with that of the sealing portion 22. The external portion 24 further has a first relatively cylindrical arm section 32 which extends generally perpendicular to the major section 30. The arm section 32 is externally threaded to accept a hose or pipe in a manner well known in the art, and the upper end, indicated 34, of the major section 30 is externally threaded for accepting a threaded cap 36. A valve inlet portion 40 is defined at the lower end of the sealing portion 22, and a valve outlet portion 42 is defined by the arm section 32 of the external portion 24.

A flow passage 50 extends in the body 20 between the valve inlet port 40 and outlet port 42 and through which the tank 12 is emptied or filled. Inasmuch as the flow passage 50 extends between the inlet and outlet ports 40 and 42, respectively, it will be understood that a portion of the flow passage 50 is in the sealing portion 22, and another portion of the flow passage 50 is in the external portion 24.

The external portion 24 also has a second relatively cylindrical arm section 54 which extends generally perpendicular to the major section 30 and in a direction generally opposite that of the first arm section 32. The interior of arm section 54 is in communication with passage 50. Arm section 54 is externally threaded to accept a safety fixture in the form of a cap 60 provided with bores 62 in the wall thereof and carrying a disc 64 which abuts the end of arm 54. In the event that the pressure within tank 12 exceeds a predetermined magnitude, disc 64 will burst allowing fluid within tank 12 to escape through passage 50 and bores 62 in a manner known to those skilled in the art. Thus, the pressure relief safety device 60 prevents dangerous rupture of tank 12 in the event of excessive internal pressure buildup, typically about 3,360 psi.

A chamber 70 is defined in the portion of the flow passage 50 provided by the sealing portion 22. Loosely captured within the chamber 70 is a valve element in the form of a spherical ball 72. The chamber 70 has an inlet end 74 at its lower end as shown and an outlet end 76 at its upper end as shown. The inlet end 74 of the ball chamber 70 is provided with diametrically opposed bores 78 for receiving a holder member 80 hereinafter described. The ball chamber 70 has a bored, cylindrical portion 82 which extends from the inlet end 74 of the chamber to a location near its outlet end which is adapted to sealingly accept a portion of the ball 72 to thereby close the flow passage 50. More specifically, the shape of the chamber outlet end 76 is complementary to that of a portion of the surface of the ball 72 so that when the ball is accepted by the outlet end 76, the surface of the ball 72 and outlet end 76 sealingly engage one another over a relatively large area. Both the bored, cylindrical portion 82 and shape of the outlet end 76 can be formed by a drilling process.

Holder member 80 is in the form of a pin fitted in the bores 78. Pin 80 has a diameter in relation to the diameter of ball 72 and chamber portion 82 so that ball 72 is retained or captive within chamber 70. Thus, ball 72 cannot fall out of chamber 70 into tank 12 but remains movably situated in chamber 70 ready for use when needed as will be described. Pin 80 fitted in bores 78 accomplishes the foregoing by means of a simple structure which is convenient and easy to install.

The ball 72 can be of any of several suitable materials, such as nonporous rubber, plastic or any material compatible with the fluid and, as discussed above, is adapted to be sealingly accepted by the outlet end 76 of the ball chamber 70. The diameter of the ball 72 is smaller than that of the cylindrical portion 82 of the ball chamber 70 so that fluid flow around the ball 72 is easily permitted, and the diameter of the ball 72 is large enough so that its escape from the ball chamber 70 past the holder member 80 is prevented as previously described.

The ball is relatively light in weight so that when the fluid pressure at the inlet end 74 of the ball chamber 70 is slightly greater than the fluid pressure at the outlet end 76 thereof, the ball is urged into sealing engagement with the valve seat defined by outlet end 76 due to the difference between the fluid pressures.

The portion of the flow passage 50 provided by the external portion 24 is defined, in part, by a portion of an internally-threaded bore 90 extending downwardly into the major section 30 from the upper end thereof and a passageway extending laterally between the valve outlet portion 42 and a side of internally-threaded bore 90. At the lower end of the internally-threaded bore 90 there is provided an upwardly-directed annular rim or ridge 92.

The portion of flow passage 50 in sealing portion 22 is provided by a bore which extends between the outer end 76 of the ball chamber 70 and the internally-threaded bore 90. The diameter of this bore is smaller than that of either the cylindrical portion 82 of the ball chamber 70 or the internally-threaded bore 90.

The valve 10 also includes valving means for opening and closing the flow passage 50 during normal valving operations. Such valving means includes an actuatable valve member, indicated 96, which is connected to the external portion 24 of the valve body 20. The valve member 96 is in the form of an externally-threaded plug which is threadably received by the internally-threaded bore 90 and which terminates in a flat end face 98. The valve member also includes a handwheel 100 for actuation of the valving means. The handwheel 100 is connected to the plug 96 by means of a shaft 102 which extends through a central opening in the cap 36.

It will be understood that rotation of the handwheel 100 relative to the valve body 20 moves the valve member 96 relative to and across the passageway of the arm section 32. Thus, movement of the valve member 96 relative to the internally-threaded opening 90 moves the plug into and out of the flow passage 50, or up and down as viewed in FIG. 1, to thereby control the flow of fluids through the passage 50. When the valve member 96 is so positioned within the opening 90 so that its end face sealingly engages the annular ridge 92, the flow through the passage 50 is completely shut off.

The valve 10 includes stop means, generally indicated 110, for preventing the ball 72 from engaging the outlet end 76 of the ball chamber 70 during normal valving operations. The stop means 110 is provided by a stem-shaped portion of the valve member 96 which extends from the lower surface or end face 98 and through the passageway so that its end, indicated 112, is positioned within ball chamber 70. In particular, the end 112 of stop means 110 is located generally between ball 72 and the outlet end 76 of ball chamber.

In accordance with the present invention, valve 10 includes bleed passage means 120 in the sealing portion 22 of valve body 20 for placing tank 12 in fluid communication with flow passage 50 at a point or location between valve seat 76 and valve member 96. The bleed passage means 120 allows release of pressure in tank 12 in a safe manner if the external portion 24 of valve body 20 is severed from sealing portion 22 in a manner which will be described. The bleed passage means 120 comprises at least one bore extending through the cylindrical wall defining sealing portion 22, and in the valve shown a plurality of bores 120 is provided. The net cross sectional area of the bleed passage means, i.e. depending upon whether one or a plurality of bores 120 is provided, is determined such that the bleed passage means is capable of releasing the pressure inside the tank in a safe manner which will not allow the tank or vessel to be propelled like a rocket. Typically the bleed passage means will allow the contents of the tank or vessel to be evacuated in a relatively short time, i.e. one-half to one hour, the objective being to allow gas to escape from tank 12 as quickly as possible but as safely as possible.

During a normal valving operation in which the tank is emptied, the ball 72 is biased by the pressure differential between the inlet and outlet ends of the ball chamber 70 toward engagement with the outlet end 76. However, the end 112 of the stem portion 110 retains the ball 72 in the position of FIG. 1 and thereby prevents the ball 72 from engaging the chamber outlet end 76. As shown in FIG. 1, the stem portion 110 is an integral extension of the valve member 96 so that the end 112 of the stem portion 110 moves up or down relative to and within the ball chamber 70 as the plug 96 is moved up or down relative to and within the internally-threaded bore 90. The diameter of the stem portion 110 is smaller than the passage bore 50 through which it is received so that the fluids entering or leaving the tank 12 easily flow between the stem portion 110 and the walls of the passage bore 50.

Thus, ball 72 normally is held by stem 110 at a location in chamber 70 out of contact with the seat 76 located at the end of the chamber. During this mode of operation, ball 72 can only float around in a casual manner in chamber 70. There is no difference when valve 10 is open and in use, allowing fluid within tank 12 to exit for use, or when valve 10 is closed and sealed off not allowing the fluid to exit. As long as valve 10 remains in this normal condition, ball 72 can never in any way close off or interfere with the flow of fluid from tank up through passage 50 to exit via outlet 42 for use or via device 60 for pressure relief.

Figure 3:
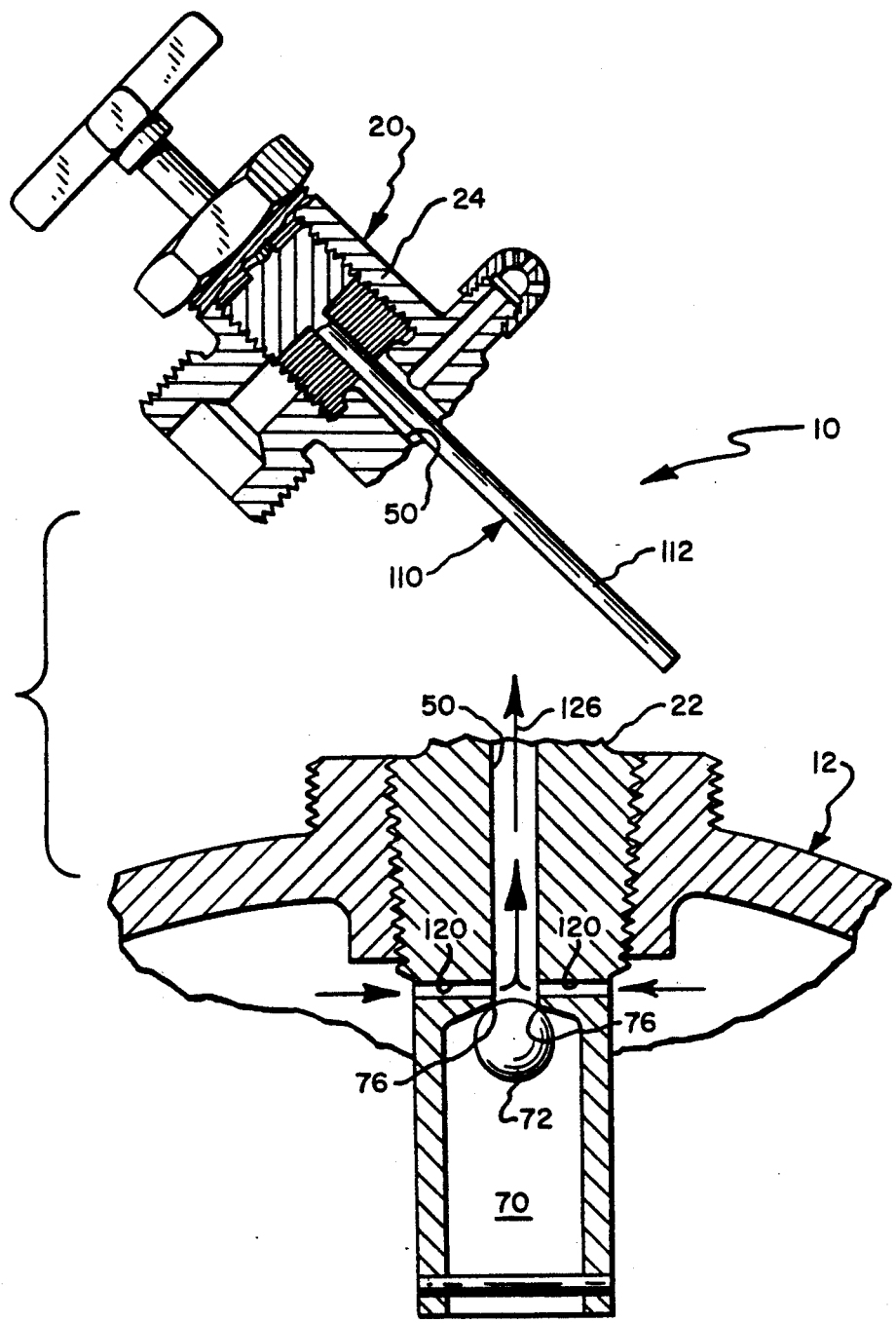
FIG. 3 is a developed fragmentary sectional view illustrating operation of the valve of FIG. 1 in response to the external portion of the valve being severed from the internal portion.

If the external portion 24 of the valve body 20 were to break away and separate from the sealing portion 22, as illustrated in FIG. 3, fluid contained under pressure within the tank rushes through the ball chamber 70, as a result of the fluid pressure drop thereacross, to escape through the passage bore 50. However, separation of the external portion 24 from sealing portion 22 withdraws the end 112 of the stem portion 110 from the ball chamber 70 so that the stem portion 110 no longer prevents the ball 72 from engaging the chamber outlet end 76. Thus, the fluid attempting to exit the tank through the passage bore 50 pushes the ball 72 into sealing engagement with the chamber outlet end 76 so that the passage bore 50 is blocked. It will be understood, therefore, that the valve 10 provides means for preventing unwanted sudden escape of contents from the tank 12 if the external portion 24 and the sealing portion 22 were to separate and prevents any damage to property or injury to persons which could result from such separation. At the same time, the bleed passage bores 120 allow release of pressure from tank 12 in a safe manner, i.e. at a relatively slow rate so that tank 12 is not propelled like a rocket. The flow is indicated at 126 in FIG. 3.

Thus, when valve portion 24 is broken away, such as in response to the valve-tank combination being dropped or impacting with another object, valve portion 24 takes with it the stem 110 as shown in FIG. 3. As the gas within tank 12 attempts to exit through the broken valve, the flow of gas through valve chamber 70 forces ball 72 into contact with valve seat 76. This, in turn, closes off passage 50 and prevents a sudden, large exit of gas from tank 12 which otherwise would propell the tank like a rocket causing injury and damage. The bleed passages 120 allow gas to escape in a small amount and for a time depending upon the pressure in tank 12. The tank thus is evacuated as quickly but as safely as possible thereby converting it to a harmless empty tank or vessel. A valve 10 provided with bleed passage means 120 is, of course, only used on tanks, cylinders or vessels containing gas which is not harmful to persons or the environment.

As previously described, the diameter of each bleed passage is selected to allow escape of gas from the container as quickly as possible but as safely as possible. By way of example, in an illustrative valve 10, the diameter of each bleed passage can be about 1/16 inch when passage 50 is about 0.303 inch in diameter.

Figure 2:
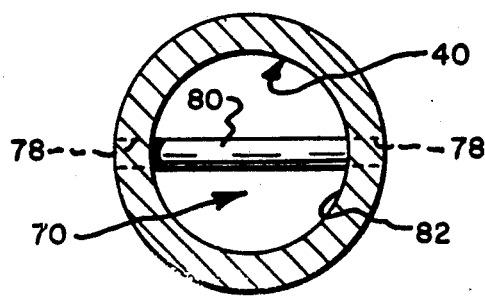
FIG. 2 is a sectional view taken about on line 2—2 in FIG. 1.

FIG. 4 illustrates operation of a valve 140 according to another embodiment of the present invention. For convenience in illustration, components of valve 140 identical to those of valve 10 in FIGS. 1-3 are identified by the same reference numerals but with a prime designation. Valve 140 is for use with tanks or vessels containing fluid which due to its nature should not be released to the environment. For example, this would include toxic or flammable or explosive gases. Accordingly, valve 140 does not include any bleed passage means. The operation of valve 140 in response to severing of external portion 24' is the same as that of the valve disclosed in my prior U.S. Pat. No. 4,562,852 issued Jan. 7, 1986 the disclosure of which is hereby incorporated by reference. Thus, in the event of such severing ball 142 is in contact with seat 76' thereby sealing passage 50' and preventing release of gas from tank 12'. Thereafter, the damaged tank 12' containing sealing portion 22' typically is transported to another location for safe disconnection of valve sealing portion 22' and removal of gas from tank 12'. During such transportation or during any temporary storage of tank 12' and sealing portion 22' beforehand or thereafter, the combination may be exposed to extreme heat causing build-up of pressure in tank 12'. This, in turn, could result in rupture of tank 12' and explosion causing serious injury and damage. Although the gas contained in tank 12' may be harmful to persons and the environment, nevertheless it may be prudent to release the gas as soon as safely possible in response to build-up of pressure beyond a safe level to avoid the greater danger of explosion and consequent injury and damage.

In accordance with this aspect of the present invention, the annular valve seat 76' is adjacent the end of flow passage 50' and the spherical ball valve element 142 is of deformable material. The diameter of ball 142 and the diameter of passage 50' are selected such that if valve external portion 24' is severed from sealing portion 22', ball 142 is forced out through passage 50' allowing release of pressure in tank 12' if that pressure exceeds a predetermined magnitude. The foregoing is illustrated in FIG. 4 wherein ball 142 is shown in solid line representation initially in contact with valve seat 76' and is shown in broken line representation as it would appear being forced along passage 50' by the pressure of gas within tank 12' and eventually being separated from valve portion 22' thereby opening passage 22' and allowing gas to escape from tank 12'.

By way of example, in an illustrative valve wherein passage 50' has a diameter of 0.303 inch, a ball 142 of Nylon having a diameter of 0.3125 inch will be foreced out through passage 50' when the pressure within tank 12' reaches 3200 p.s.i.

Of course, when valve 140 is used with a tank or vessel containing fluid not harmful to persons or the environment, valve 140 can be provided with bleed passage means similar to that of valve 10 of FIGS. 1-3 in combination with a pressure deformable valve element ball 142 which separates from the valve as described above when the internal pressure exceeds a predetermined magnitude.

It is therefore apparent that the present invention accomplishes its intended objects. While embodiments of the present invention have been described in detail, that is for the purpose of illustration, not limitation.

I claim:

1. A combination safety and service valve for a high pressure tank, said valve comprising:

a body having a sealing portion positioned within the tank and an external portion positioned externally of the tank, said sealing portion including an inlet port and an outlet port, said body having a flow passage extending between said inlet and outlet ports so that a portion of said flow passage is provided by said sealing portion and another portion of said flow passage is provided by said external portion of said body, said portion of said flow passage provided by said sealing portion including a chamber, said chamber having an inlet end and an outlet end, said outlet end having a valve seat positioned within the tank opening between an inlet and an outlet of the tank opening;

a valve element being loosely received by said chamber and adapted to engage said valve seat to thereby close said flow passage, said valve element being of such size that when the fluid pressure at said chamber inlet end is higher than the fluid pressure at said chamber outlet end, said valve element is biased into sealing engagement with said valve seat of said chamber and substantially all of said valve element being disposed within the tank opening between said inlet and said outlet of the tank opening;

an actuatable valve member connected to said external portion of said body for opening and closing said flow passage;

stop means associated with said valve member for preventing said valve element from engaging said valve seat in all open positions of said valve member until said external portion of said body is severed from said sealing portion; and bleed passage means in said sealing portion of said body for placing said tank in fluid communication with said flow passage between said valve seat and said valve member, said bleed passage means allowing release of pressure in said tank in a safe manner if said external portion of said body is severed from said sealing portion.

2. A valve according to claim 1, wherein said sealing portion of said valve body includes a wall of generally cylindrical shape and wherein said bleed passage means comprises at least one bore extending through said wall.

3. A valve according to claim 2, wherein said bleed passage means comprises a plurality of bores extending through said wall.

4. A valve according to claim 1, wherein said valve element comprises a spherical ball and said valve seat is annular.

5. A combination safety and service valve for a high pressure tank, said valve comprising:

a body having a sealing portion positioned within the tank and an external portion positioned externally of the tank, said sealing portion including an inlet port and an outlet port, said body having a flow passage extending between said inlet and outlet ports so that a portion of said flow passage is provided by said sealing portion and another portion of said flow passage is provided by said external portion of said body, said portion of said flow passage provided by said sealing portion including a chamber, said chamber having an inlet end and an outlet end, said outlet end having an annular valve seat positioned within the tank opening between an inlet and an outlet of the tank opening and in operative association with said flow passage;

a valve element in the form of a spherical ball being loosely received by said chamber and adapted to engage said valve seat to thereby close said flow passage, said valve element being of such size that when the fluid pressure at said chamber inlet end is higher than the fluid pressure at said chamber outlet end, said valve element is biased into sealing engagement with said valve seat of said chamber and substantially all of said valve element being disposed within the tank opening between said inlet and said outlet of the tank opening;

an actuatable valve member connected to said external portion of said body for opening and closing said flow passage;

stop means associated with said valve member for preventing said valve element from engaging said valve seat in all open positions of said valve member until said external portion of said body is severed from said sealing portion; and said valve element being of deformable material and the diameter of said ball and the diameter of said passage being selected such that if said external portion of said body is severed from said sealing portion said valve element is forced out through said passage allowing release of pressure in said tank if said pressure exceeds a predetermined magnitude.

6. A valve according to claim 5, wherein said valve element is of plastic material.

7. A valve according to claim 5, further including bleed passage means in said sealing portion of said body for placing said tank in fluid communication with said flow passage between said valve seat and said valve member, said bleed passage means allowing release of pressure in said tank in a safe manner if said external portion of said body is severed from said sealing portion.

8. A valve according to claim 7, wherein said sealing portion of said valve body includes a wall of generally cylindrical shape and wherein said bleed passage means comprises at least one bore extending through said wall.

9. A valve according to claim 7, wherein said bleed passage means comprises a plurality of bores extending through said wall.

* * * * *